Nov. 5, 1968     S. BRANCATO ET AL     3,408,998
OUTDOOR HEATER
Filed Aug. 28, 1967
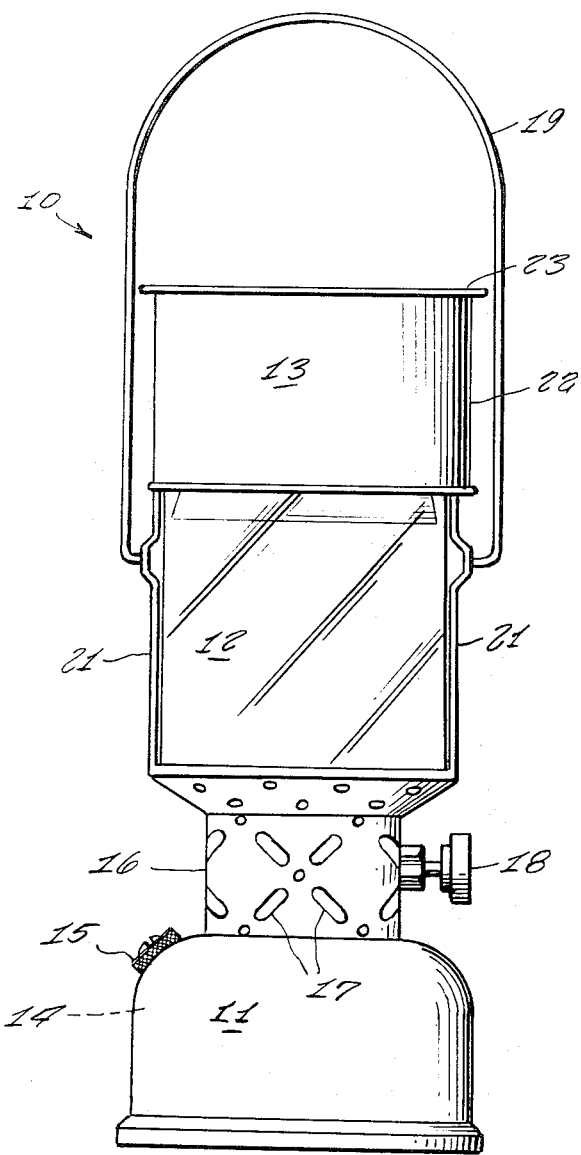
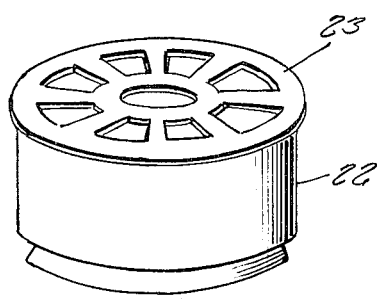
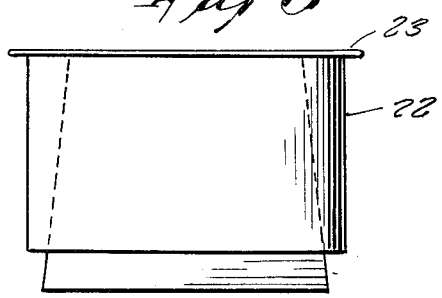
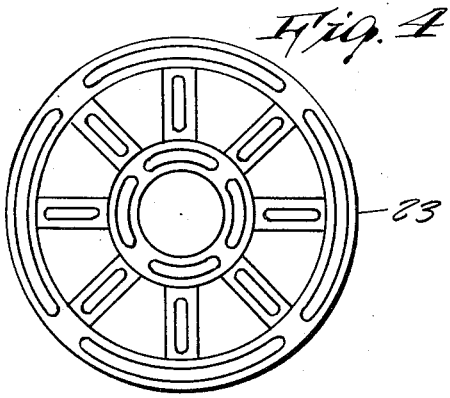
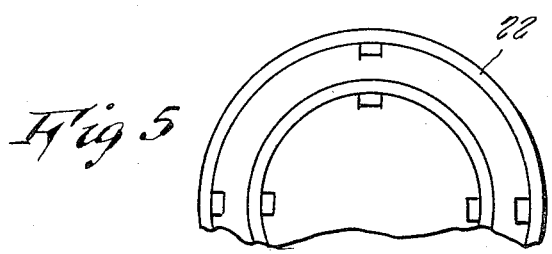
INVENTORS
SALVATORE BRANCATO
AND
SALVATORE GAMBELUNGHI

United States Patent Office 3,408,998
Patented Nov. 5, 1968

3,408,998
OUTDOOR HEATER
Salvatore Brancato and Salvatore Gambelunghi, both of 13—39 146th Place, Whitestone, N.Y. 11357
Filed Aug. 28, 1967, Ser. No. 663,847
1 Claim. (Cl. 126—4)

ABSTRACT OF THE DISCLOSURE

A heater for out-of-doors use, including a base, a reflector, and a cooking adapter so to allow use of the device for heating purposes as well as for cooking foods.

---

This invention relates generally to portable heaters and stoves. More specifically it relates to portable heaters and stoves which are used out-of-doors.

A principal object of the present invention is to provide an outdoor heater which has self contained means for being selectively used for heating, lighting or cooking purposes.

Another object is to provide an outdoor heater having a convenient handle so that it may be easily carried by sportsmen such as hunters and fishermen and which can be used in their camp to provide living comfort in heating and cooking.

Yet another object is to provide an outdoor heater wherein there is included a removable cooking adapter so that the device may be used for either heating, cooking or lighting.

Other objects are to provide an outdoor heater which is simple in design, inexpensive to manufacture, rugged in construction, easy to use and efficient in operation.

These and other objects will be readily evident upon a study of the following specification and the accompanying drawing wherein:

FIGURE 1 is a side elevation view of the invention shown assembled,

FIGURE 2 is a perspective view of the cooking adapter,

FIGURE 3 is a side view thereof,

FIGURE 4 is a plan view of a cooking adapter cover, and

FIGURE 5 is a plan view of the adapter without the cover.

Referring now to the drawing in detail, the reference numeral 10 represents an outdoor heater according to the present invention wherein there is the conventional base 11, a chimney reflector 12 and a novel cooking adapter 13.

The base 11 comprises a vessel or tank 14 for liquid fuel which is placed into the tank through an opening that is then closed by a cap 15. The base includes a relatively narrow neck 16 over the tank, the neck being provided with a plurality of air vents 17 so to give oxygen to the burning fuel. A conventional adjustment knob 18 serves to regulate fuel and air pressure to the burner (not shown).

The chimney or heat reflector 12 of cylindrical configuration is mounted over the neck 16 and is of a transparent material so as to provide illumination in the out-of-doors as an additional feature.

A U-shaped handle 19 is secured pivotally free at its ends in a frame 21 at opposite sides of the chimney, the frame being integral with the neck.

The cooking adapter 13 comprises a cylindrical member 22 having a cover 23, the cooking adapter being removably placeable upon the upper end of the chimney 12 as is shown in FIGURE 1 of the drawing.

In operative use, the outdoor heater may be used to provide either illumination, heat for a tent or heat for cooking purposes.

The adapter 22 is a replacement for the usual lantern cover that is mounted on the chimney reflector 12. The provision of apertures in the cover 23 is suitable for cooking and heating purposes. The tapered portion of the adapter extends into the reflector 12 and causes a good heat conveyance to the surface of the cover 23 used for cooking.

While various changes may be made in the detail construction, it is understood that such changes will be within the spirit and scope of the present invention.

Having thus set forth and disclosed the nature of this invention, what is claimed is:

1. In an outdoor heater, the combination of a means for storage of fuel, means for burning said fuel, said storage means comprising a tank forming a base, a relatively narrow neck surmounted on said base, air vent openings in said neck, an opening for admitting fuel into said tank, said tank opening being closed by a removable cap, and said neck providing support means for a chimney, said chimney comprising a cylindrical, transparent element mounted on said neck, and a removable cooking adapter carried on said chimney, said cooking adapter comprising a cylindrical member with a removable cover thereupon and with a tapered portion tapering upwardly and inwardly thereof, the bottom end thereof protruding outwardly of the bottom end of the adapter, said cover having a central opening, slots radiating from the central opening and circumferential slots around the radial slots.

References Cited

UNITED STATES PATENTS

| | | | |
|---|---|---|---|
| 472,594 | 4/1892 | Upton | 126—49 |
| 1,177,945 | 4/1916 | Gambel | 126—47 |

FREDERICK L. MATTESON, Jr. Primary Examiner.

E. G. FAVORS, Assistant Examiner.